United States Patent [19]

Heinrich et al.

[11] Patent Number: 4,694,581
[45] Date of Patent: Sep. 22, 1987

[54] HEIGHT-MEASURING DEVICE

[75] Inventors: William P. Heinrich, McHenry; Norbert Leopoldi, Chicago, both of Ill.

[73] Assignee: Genentech, Inc., San Francisco, Calif.

[21] Appl. No.: 944,006

[22] Filed: Dec. 22, 1986

[51] Int. Cl.⁴ .............................................. G01B 5/02
[52] U.S. Cl. .................................................. 33/169 R
[58] Field of Search ..................................... 33/169 R

[56] References Cited

U.S. PATENT DOCUMENTS

| | | | |
|---|---|---|---|
| 442,192 | 12/1890 | Lewis | 33/169 R |
| 2,215,884 | 9/1940 | Runge | 33/169 R |
| 3,313,030 | 4/1967 | Heys | 33/169 P |

*Primary Examiner*—Harry N. Haroian
*Attorney, Agent, or Firm*—Milton S. Gerstein

[57] ABSTRACT

A height-measuring device in which there is provided a vertically-mounted ruler element and associated slide-mount in which slides a slide having a lower surface for resting on the head of a person to be measured. The slide has a pair of rearwardly extending flanges that act as runners for sliding in channels formed in the slide-mount. The slide has a bracket extending from the flanges, which bracket has a pair of side surfaces which mounts a hexagonal-head screw, the head of which is nonrotatably mounted in one side surface. A locking nut is mounted at the end of the screw and is rotatable in a first direction to urge the pair of side surfaces, which are made of hard plastic, toward each other, and, therefore, also the flanges, to cause the flanges into clamping relationship with the inner surface walls of the pair of channels. The lower surface of the slide is coplanar with a surface which indicates on the ruler element directly adjacent thereto the correct height measurement.

11 Claims, 8 Drawing Figures

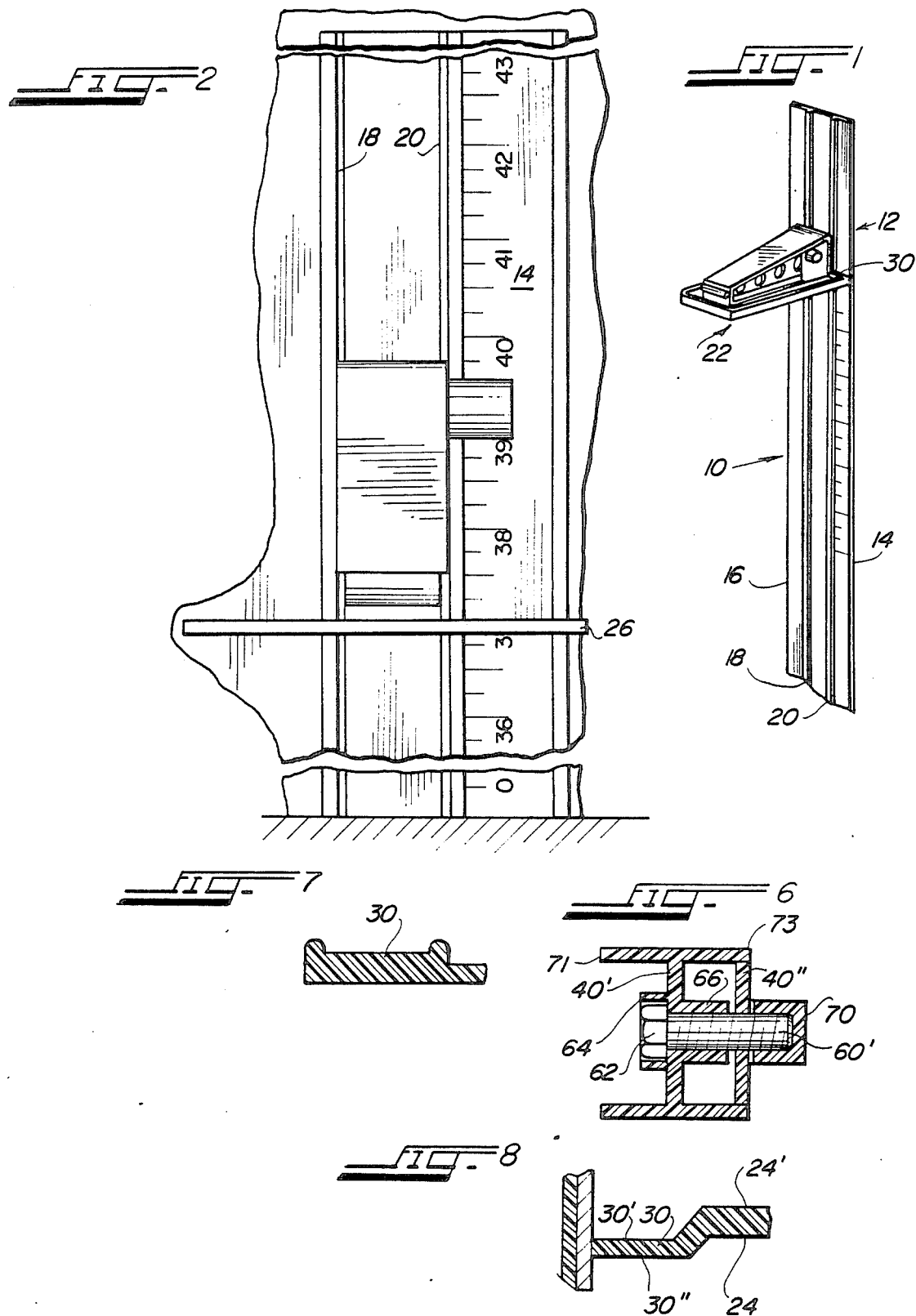

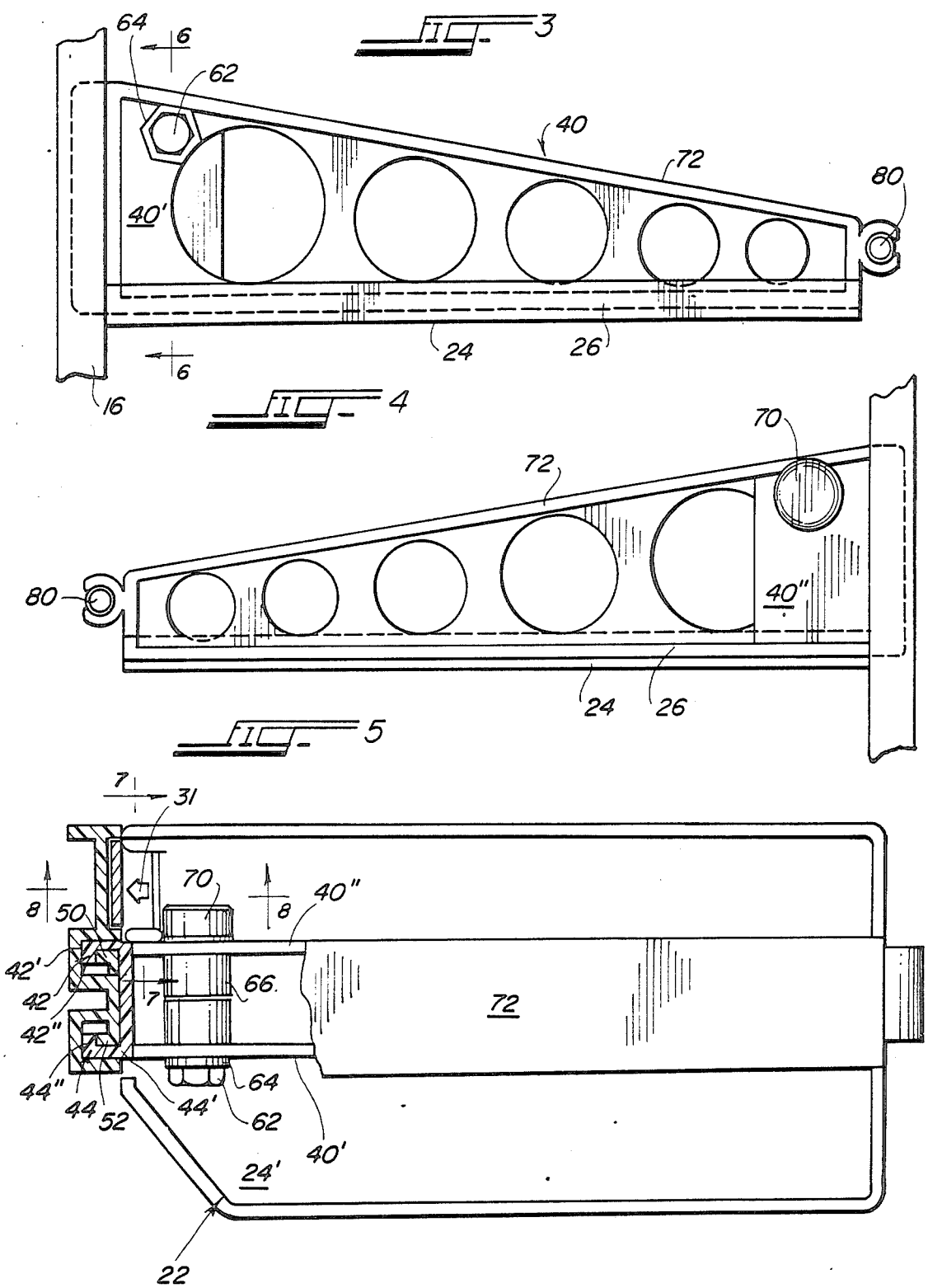

4,694,581

HEIGHT-MEASURING DEVICE

BACKGROUND OF THE INVENTION

The present invention is directed to a height-measuring device for determining the height of children or adults. Numerous prior art devices exist, all of which include a fixed vertical member and a horizontally-disposed, vertically-slidable adjusting element. The present invention is an improvement over these prior art devices, and allows for a more accurate, as well as easier, reading of the height.

SUMMARY OF THE INVENTION

It is the primary objective of the present invention to provide a height measuring device which incorporates a fixed, vertically-mounted ruler element, a fixed, coextensive slide-mounting element formed integrally with the ruler element, and a horizontally-disposed, vertically-slidable height measuring element mounted for sliding movement in the slide-mounting element. The height measuring element is provided with a locking nut which urges a pair of flange-runners against the inner wall surfaces of a pair of channels serving as the guides formed vertically in the slide-mounting element. The height measuring element is made entirely of hard plastic, and also includes an indexing surface for indicating on the ruler element the height measurement. The indexing surface is coplanar with the lower surface of the height measuring element, which lower surface contacts the uppermost portion of the head of the person being measured. The indexing surfaces extends generally in front of the ruler element, and disposed laterally of the locking nut.

BRIEF DESCRIPTION OF THE DRAWINGS

The invention will be more readily understood with reference to the accompanying drawings, wherein;

FIG. 1 is a perspective view of the height-measuring device of the invention;

FIG. 2 is an enlarged front view of the height-measuring device of FIG. 1;

FIG. 3 is a side elevational view of the height-measuring element of the device of FIG. 1;

FIG. 4 is also a side elevational view of the height-measuring element of FIG. 1 on the opposite side of that shown in FIG. 3;

FIG. 5 is a detailed view, in partial cross-section of the height measuring element and the cooperating slide-mounting element;

FIG. 6 is a cross-sectional view taken along line 6—6 of FIG. 3;

FIG. 7 is a cross-sectional view taken along line 7—7 of FIG. 5;

FIG. 8 is across-sectional view taken along line 8—8 of FIG. 5.

DETAILED DESCRIPTION OF THE INVENTION

Referring now to the drawings in greater detail, the height-measuring device of the invention is indicated generally by reference numberal 10 in FIG. 1. The device 10 includes a fixed, vertically-disposed portion 12 which includes ruler element 14 and slide-mounting element 16. The two elements 14 and 16 are preferably formed integrally from one piece of hard plastic. The ruler element 14 includes the conventional indices for indicating the measurement, while the element 16 includes a pair of parallel, vertically-disposed grooves or channels 18 and 20, by which is slidably mounted a height-measuring element 22. The height-measuring element 22 includes a lowermost planar, horizontally-disposed surface 24 which abuts against the top of a person's head being measured. The lowermost surface 24 has a lateral width that substantially spans the entire width of the ruler element 14 and at least most of the width of the slide-mounting element 16. The lowermost surface 24 is actually part of a slide element 26 which has a thickness taken in the vertical direction. This slide element 26 is formed with a rearward, corner surface area 30 best seen in FIGS. 7 and 8. The surface 30 has an uppermost portion 30' that is coplanar with the lowermost surface 24. This upper surface 30' is provided with an indexing arrow 31 for indicating on the ruler element 14 the correct measurement. Since the lowermost surface 24 rests upon a head of the person to be measured it is essential that the surface 30' be coplanar therewith, the arrow 31 being formed in the surface 30' in a coplanar arrangement. The surface 30 gradually declines from the upper surface 24' of the slide element 26, and includes a lowermost surface 30" that generally lies in a horizontal plane spaced below the lowermost surface 24 as clearly shown in FIG. 8.

The height-measuring element 22 also includes a slide-support for guided movement in the channels 18 and 20 and for suspending the slide element 26 in its horizontal orientation. This slide-support includes a generally truncated, triangular cross-sectional bracket member 40 as best seen in FIGS. 3 and 4. A series of spaced circular openings are formed in this bracket member to provide lightness to the overall slide element. The slide-element 26 is preferably formed integrally with the bracket member 40, all being made of a hard plastic such as high-impact styrene. The bracket member 40 has a pair of L-shaped flanges 42 and 44 which serve as the slide runners in the channels 18 and 20, respectively. These flanges 42 and 44 cooperate with the generally U-shaped channels 18 and 20 as best seen in FIG. 4. One leg portion of each channel 18 and 20 opens outwardly to allow for the projection of the respective portions 42' and 44' of the flanges 42 and 44 outwardly therefrom. This arrangement allows for the mounting of the flanges 42 and 44 in the channels 18 and 20, yet prevents the removal of these flanges in the forward, horizontal direction through the cooperation of the bent portions 42" and 44" with the central ribs 50 and 52 of the channels 18 and 20. Thus, vertical sliding movement is allowed for the flanges, and the connected bracket member 40, while any horizontal movement therefor is prevented.

The bracket member 40 is designed so that it may be held in any vertical position along the length of the slide-mounting element 16. This is accomplished by a screw 60 best seen on FIG. 6, which has a hexagonally-shaped head 62. The side surface 40' of the bracket member has a hexagonally-shaped sleeve in which fits the hexagonally-shaped head 62, so that the screw 60 is prevented from rotating in the circular sleeve 66, through which the shank of the screw extends, as clearly shown in FIG. 6. The length of the screw is such that its distal end 60' projects beyond the other side surface 40" of the bracket member. A locking nut 70 is mounted about the end 60' for either locking or unlocking the bracket member 40 via the L-shaped flanges 42, 44. Locking is accomplished by rotating the nut 70 in a first direction to cause the movement thereof toward the hexagonally-shaped head 62, which causes the drawing together of the two side surfaces 40' and 40", and, therefore, the drawing together of the two L-shaped flanges 42, 44 integrally connected to and extending rearwardly from the rear edge surfaces of the side surfaces 40', 40", respectively, as shown in FIG. 5. This drawing together of the two L-shaped flanges 42, 44 tightens their grip on the mating surfaces of the U-shaped channels 18, 20, such that the inner, mutually-facing surfaces of the L-shaped flanges sandwich therebetween the ribs 50, 52 of the channels in tight engagement, so that any vertical movement is prevented in clamp-like fashion. Rotation of the locking nut 70 in the other direction releases this grip of the flanges, so that sliding movement may recur. The bracket member 40 is locked in place after the lowermost surface 24 has been oriented on the uppermost surface of the head of the person to be measured, so that after the person being measured has removed himself from beneath the bracket member 40, reading of his height may be easily accomplished by the reading of the ruler element via the indexing surface 30. In the preferred form of the invention, the side surface 40" extends only a partial distance along the length of the bracket member 40, as shown in FIG. 4, to provide lightness to the bracket member, for ease of movement and positioning, while the side surface 40', as described above, is provided with a series of different-diameter, circular openings, again for lightness while still retaining structural integrity. The side surface 40' is also generally arranged between the end edges 71 and 73 of the upper, downwardly-sloping surface 72 of the bracket member, to add greater structural stability. A level 80 is also provided at the remote end of the bracket member for indicating the correctness of vertical mounting of the elements 14, 16, 18, 20, and the horizontal mounting of the bracket member 40. The entire device is fixedly mounted to a wall, by any conventional means.

While a specific embodiment of the invention has been shown and described, it is to be understood that numerous changes and modifications may be made without departing from the scope and spirit of the invention as set out in the appended claims.

What is claimed is:

1. A height-measuring device for measuring the height of a person, comprising:
   a ruler element having indices thereon, said ruler element being elongated and having a central longitudinal axis;
   slide-mounting means integrally formed with said ruler element and coplanar therewith, said slide-mounting means being positioned at one longitudinal side of said ruler element such that said ruler element and said slide-mounting means form substantially one coherent unit;
   said slide-mounting means having at least one longitudinally extending channel;
   slide means having at least one slide-runner for sliding engagement and movement in said at least one channel;
   height-measuring plate means having a lower, flat surface that may be placed upon the top of a persons's head who is being measured;
   means for selectively locking and unlocking said slide means in said channel;
   said slide means fixedly mounting said height-measuring plate means such that said plate means extends therebelow;
   said channel being a substantially U-shaped channel having a first open face through which projects said slide-runner, and a second closed face, said slide-mounting means having a central rib about which is defined said U-shaped channel; said slide-runner being substantially L-shaped a portion of which is disposed adjacent to said central rib, so that said central prevents the outward removal of said slide-runner from engagement in said channel.

2. The height-measuring device according to claim 1, wherein said slide-mounting means comprises a pair of said channels extending parallel to each other longitudinally along said slide-mounting means; said slide means comprising a pair of slide-runners; each said channel being similarly shaped and each said slide-runner being similarly shaped.

3. A height-measuring device for measuring the height of a person, comprising:
   a ruler element having indices thereon, said ruler element being elongated and having a central longitudinal axis;
   slide-mounting means integrally formed with said ruler element and coplanar therewith, said slide-mounting means being positioned at one longitudinal side of said ruler element such that said ruler element and said slide-mounting means form substantially one coherent unit;
   said slide-mounting means having at least one longitudinally extending channel;
   slide means having at least one slide-runner for sliding engagement and movement in said at least one channel;
   height-measuring plate means having a lower, flat surface that may be placed upon the top of a person's head who is being measured;
   means for selectively locking and unlocking said slide means in said channel;
   said slide means fixedly mounting said height-measuring plate means such that said plate means extends therebelow;
   said slide means comprising a bracket means from the rear surface of which projects said at least one slide-runner, said bracket means comprising a first side surface and a second side surface integrally connected to said rear surface;
   said means for locking and unlocking comprising screw means having a shank portion and a head portion, said shank portion extending through both of said first and second side surfaces, and nut means mounted adjacent an end portion of said shank portion, one of said nut means and said head portion being nonrotatably mounted by one of said first and second side surfaces, whereby said first and second side surfaces may be urged toward each other to thereby force said slide-runner against an inner surface of said channel to thereby lock said slide means in place at a selected location along said slide-mounting means.

4. The height-measuring device according to claim 3, wherein said bracket means comprises a lower portion that fixedly mounts thereto said plate means; said plate means having a lateral width greater than the lateral width of said bracket means as measured between said first and second side surfaces, a portion of said plate means projecting laterally outwardly from said bracket means and located directly in front of said ruler element and having an inner corner surface area comprising an upper surface coplanar with said lower, flat surface, said upper surface being juxtaposed directly adjacent to said ruler element for indicating thereby which of the indices on said ruler element is to be read.

5. The height-measuring device according to claim 4, wherein said second side surface is truncated and extends only partially of the length of said first side surface originating from said rear surface.

6. The height-measuring device according to claim 3, wherein said slide means comprises a pair of spaced apart slide runners, and said slide-mounting means comprises a pair of channels for slidingly receiving therein said pair of slide runners; said pair of slide runners extending from said rear surface of said bracket means, such that when said first and second side surfaces of said bracket means are urged towards each other, said slide runners are urged against the inner surface walls of said pair of channels to thereby clamp said bracket means in place.

7. The height-measuring device according to claim 6, wherein each of said channels comprises a pair of channel legs divided by a central, longitudinally-extending rib; each of said slide runners comprising a first leg portion projecting from said rear surface and a second leg portion extending at an angle from the end of said first leg portion which second end lies remote from said rear surface, said second leg portion lying juxtaposed against the respective said rib of the respective said channel to prevent the outward removal of said bracket means from its connection with said channels.

8. The height-measuring device according to claim 3, wherein said bracket means comprises a front surface; and further comprising level means mounted to said front surface for indicating correct vertical orientation.

9. The height-measuring device according to claim 3, wherein said bracket means comprises a front surface, and wherein said first side surface is positioned between the end edges of said front surface such that the upper and lower surfaces of said bracket means extend beyond said first side surface in a direction away from said ruler element for providing structural integrity and lightness to the bracket means.

10. The height-measuring device according to claim 9, wherein said first side surface comprises a series of holes for making said bracket means lighter.

11. A height-measuring device comprising:
a ruler means having indices thereon for indicating height, said ruler means having a lateral extension having a pair of parallel channels extending parallel to the longitudinal axis of said ruler means;
slide means for sliding in said pair of channels, said slide means comprising a pair of flange members each having a portion thereof for sliding movement in a respective said channel, said portion having also means preventing the removal of said slide means from the front of said respective channel; said respective channel having cooperating means for preventing the forward removal of said portion;
said slide means further comprising a bracket means to the rear surface of which project said pair of flange members, said bracket means having a lower flat plate means having a lower surface for resting on the head of a person whose height is to be measured; and
means for selectively locking in place said pair of flange members in said pair of channels, said means for locking comprising a screw means passing through said bracket means and comprising a noncircular head, said bracket means having a first side surface in which is formed a noncircular cutout in which is received said noncircular head of said screw means, and a second side surface; said means for locking further comprising a locking nut for cooperation with the end of said screw means which end passes through said second side surface, whereby upon rotation of said nut in a first direction, said side surfaces and therefore said pair of flange members are urged toward each other to thereby grip the inner wall surfaces of said pair of channels and clamp said bracket means in place.

* * * * *